United States Patent [19]

Hough et al.

[11] Patent Number: 5,555,414
[45] Date of Patent: Sep. 10, 1996

[54] MULTIPROCESSING SYSTEM INCLUDING GATING OF HOST I/O AND EXTERNAL ENABLEMENT TO GUEST ENABLEMENT AT POLLING INTERVALS

[75] Inventors: Roger E. Hough, Austin, Tex.; Robert E. Murray, Kingston, N.Y.

[73] Assignee: International Business Machines Corporation, Armonk, N.Y.

[21] Appl. No.: 355,566

[22] Filed: Dec. 14, 1994

[51] Int. Cl.$^6$ .................................................... G06F 13/00
[52] U.S. Cl. ........................ 395/734; 395/700; 395/733
[58] Field of Search ........................... 364/200; 395/275, 395/700, 734, 733

[56] References Cited

U.S. PATENT DOCUMENTS

| | | |
|---|---|---|
| 4,456,954 | 6/1984 | Bullions, III et al. . |
| 4,494,189 | 1/1985 | Bean et al. . |
| 4,533,996 | 8/1985 | Hartung et al. . |
| 4,564,903 | 1/1986 | Guyette et al. . |
| 4,674,038 | 6/1987 | Brelsford et al. . |
| 4,695,950 | 9/1987 | Brandt et al. . |
| 4,779,188 | 10/1988 | Gum et al. . |
| 4,843,541 | 6/1989 | Bean et al. . |
| 5,023,771 | 6/1991 | Kishi . |
| 5,038,281 | 8/1991 | Peters . |
| 5,222,215 | 6/1993 | Chou et al. . |

OTHER PUBLICATIONS

*IBM Technical Disclosure Bulletin*, "Method to Allow a Virtual Machine Guest Operating System to Calculate Accurate Elapsed Times for Accounting Purposes," No. 2, Jul. 1991, pp. 220–221.
*IBM Technical Disclosure Bulletin*, "State Change Pending Handling in Virtual Machine Operating Systems", No. 8, Jan. 1991, pp. 23–28.
*IBM Technical Disclosure Bulletin*, "Extensible User Authentication in a Computer Operating System," No. 9, Feb. 1992, pp. 480–482.
*IBM Technical Disclosue Bulletin*, "Virtual Start I/O Fast Release", Jun. 1977, pp. 124–125.
*IBM Technical Newsletter*, "IBM System/370 Extended Architecture Interpretive Execution," SN22–0692, Feb. 1986 to SA22–7095–1.
*IBM Technical Publication*, "IBM System/370 Extended Architecture Interpretive Execution," SA22–7095–1, Sep. 1985.
Abstract, "Mach Interfaces to Support Guest OS Debugging," R. A. Hoven, Proceedings of the USENIX Mach Symposium, USENIX Assoc., Nov. 20–22, 1991, pp. 131–147.

(List continued on next page.)

*Primary Examiner*—Jack B. Harvey
*Assistant Examiner*—John Travis
*Attorney, Agent, or Firm*—Bernard M. Goldman; JoAnn K. Crockatt

[57] ABSTRACT

A data processing system operating under a multiprocessing hypervisor program subject to I/O interrupts during a polling interval of the hypervisor program includes one or more processors for executing the hypervisor program and host system and one or more guest systems under the hypervisor program, a storage system connected to the processor's by a bus for storing instructions, data and control information associated with the systems being executed by the processor, the storage system may be partitioned into a number of separate areas each associated with one of the concurrently operating systems, an input/output subsystem for generating I/O interrupts to the processors, apparatus for testing to determine if the system is operating in an interpretive execution mode, apparatus for determining whether a dedicated region facility is active, apparatus for testing whether an I/O enablement mask for a guest system has been set, apparatus for setting a flag if the guest system I/O enablement mask is set, apparatus for testing the flag during each polling interval of the interpretive execution mode, apparatus for loading a control byte from a host control register into a hardware register if the flag has not been set and a count threshold reached, apparatus for testing for host system I/O interrupts and apparatus for switching to the host system if the host system interrupt is present.

6 Claims, 7 Drawing Sheets

OTHER PUBLICATIONS

Abstract, "Extending a Stand–Alone Personal Computer to Integrate Multiple Operating Systems Concurrently," Ce Kuen Shieh and Li Ming Tseng, Res. Inst. of Electr. & Comput. Eng., Nat. Chengi–Kung Univ., vol. 9, No. 1, Jan. 1989, pp. 41–49.

Abstract, "Introduction to VTAM for VM Users," SHARE Eur. Assoc., Nijmegen, Netherlands, vol. 1, 1985, pp. 89–92.

Abstract, "VM Group Control System," L. J. Delmolino, SEAS, Nijmegen, Netherlands, vol. 2, Sep. 1984, pp. 493–497.

Abstract, "A Network Operating System for Microcomputers," A. A. Ananda and B. W. Marsden, *Comput. Commun.*, vol. 7, No. 2, Apr. 1984, pp. 65–72.

Abstract, "Guest layering Distributed Processing Support on Local Operating Systems," S. A. Mamrak et al., IEEEE, New York, Oct. 1982, pp. 854–859.

Abstract, "A Report on Process Management in a Guest Distributed System", I. Gertner, IEEE, New York, Oct. 1982, pp. 206–211.

Abstract, "An Architecture for Support of Network Operating System Services," R. W. Watson and J. G. Fletcher, Lawrence, vol. 4, No. 1, Feb. 1980, pp. 33–49.

Abstract, "ADAPT: A Guest System," R. Peebles, and T. Dopirak, IEEE, New York, Feb. 1980, pp. 445–454.

Abstract, "Alternate Path Group ID Support," P. A. Malinowsky and H. M. Udenfriend, Research Disclosure No. 319, Nov. 1990.

*IBM J. Res. Develop.*, "System/370 Extended Architecture: Facilities for Virtual Machines," vol. 27, No. 6, Nov. 1983.

MULTIPROCESSING SYSTEM INCLUDING GATING OF HOST I/O AND EXTERNAL ENABLEMENT TO GUEST ENABLEMENT AT POLLING INTERVALS

BACKGROUND OF THE INVENTION

1. Field of the Invention

The present invention relates to a multiprocessing information handling system and more particularly to a multiprocessing information handling system having a host system and one or more guest systems running concurrently wherein control of I/O interrupts is examined during polling intervals of a hypervisor program.

2. Background

Virtual machine (VM) hypervisor programs have been in public use for many years, e.g. IBM VM/System Product (SP). VM/SP normally is loaded into the high address end of main storage and coordinates the running of programs by a plurality of users who respectively interface a data processing system from any of a number of keyboard/display terminals which are usually distant from the one or more central processing units (CPUs) and the main storage (MS) of the system.

The advantage of VM is that it gives each of its users the apparent data processing power of a large system by giving each user an apparent or logical CPU. Plural logical CPUs could share each real CPU resource(s) in the system. The VM users (who are sometimes called "guests" of the VM "host" control program) are assigned by the VM control program to different MS areas in which to operate as the user performs work on the system.

Any VM guest may run any type of program that is designed to interface the architecture of the connected real system, e.g. the S/360, S/370, S/370XA or S/390 architected instruction set may be used by any guest program running on a S/390 hardware system.

Operating systems programs, such as MVS, have been run as one of plural guests under VM/SP, under which MVS/SP was often the preferred guest because it was used as the production svstem. The preferred guest managed its assigned part of MS, which is called the guest's real storage since to the guest operating system this is the system storage under its control. The preferred guest was run with its virtual storage addresses translating to the guest real addresses that are equal to a host virtual address that is equal to host's real storage addresses, and was sometimes called the V=R guest (i.e., host virtual=host real).

Logical resource partitioning of a data processing system is taught in U.S. Pat. No. 4,843,541. The system described in the '541 patent provides extensive background information which is helpful to understanding the present invention.

U.S. Pat. No. 4,843,541 is hereby incorporated by reference into the present application.

The logical resource partitioning taught in the '541 patent relates to method and means for partitioning resources of a central electronic complex of a data processing system into a plurality of logical partitions. The partitioning system may be embodied in programming, microcode or by special hardware to enable highly efficient operation of a plurality of different programming systems in different zones of the system. The patent shows assignment of subsets of random access storage, central processor, I/O channel and subchannel resources to different logical partitions of the system to enable a plurality of different preferred guest programming systems to run simultaneously in the different partitions. The system of the patent also includes partitioning the I/O channel and subchannel resources among different partitions.

U.S. Pat. No. 5,222,215 teaches a hardware mechanism for I/O interruption handling in a multiprocessing system. A processor interface recognizes a large number of I/O interrupt queues in a logically partitioned data processing system. Different partitions may contain different guest operating systems. The processor interface controls how plural processors respond to I/O interrupts on numerous hardware control queues. A host hypervisor program dispatches the guest operating systems. The guest systems use the I/O interruptions in controlling the dispatching of programs on the processors in the system. A system taught by the patent allows the number of guest partitions in a system to exceed the number of I/O interrupt subclasses architected into the system and enables the dispatching controls of each guest operating system to be sensitive to different priorities for a number of programs operating under a respective guest. The invention described in the patent provides processor controls which support alerting the host to enable I/O interrupts and provide the processor control to pass-through for enabling direct guest handling of guest I/O interrupts.

although the system taught by the patent handles I/O interrupts in such a manner as to prevent a guest system from blocking an I/O interrupt for the host system, the patented system provides a solution which is very complex and expensive in hardware implementation and is not the most efficient solution to the problem of dealing with guest system blocking host I/O interrupts.

The above-described prior art, while showing improvements in data processing systems having a number of processes running concurrently in different partitions of the system, did not adequately address the problem which occurs when a guest system blocks an I/O interrupt directed to the host system in a multiprocessing data processing system.

SUMMARY OF THE INVENTION

Therefore, it is an object of the present invention to efficiently handle I/O interrupt requests to one of a number of systems nmning concurrently in a multiprocessing system so as to eliminate blocking of an I/O request to a host system by a guest system.

Accordingly, a data processing system operating under a multiprocessing hypervisor program subject to I/O interrupts during a polling interval of the hypervisor program includes one or more processors for executing the hypervisor program and host and guest systems under the hypervisor program, a storage system connected to the processing system for storing instructions and data associated with the systems being executed by the processor, the storage system may be partitioned into a number of separate areas each associated with one of the concurrently operating systems such as a host or a guest, an input/output subsystem for generating I/O interrupts to the processors, means for testing to determine if the system is operating in an interpretive execution mode, means for determining whether a dedicated region facility is active, means for testing whether an I/O enablement mask for a guest system has been set, means for setting a flag if the guest system I/O enablement mask is set, means for testing the flag during each polling interval of the interpretive execution mode, means for loading a control byte from a host control register into a hardware register if the flag bit is not set, means for testing for host system I/O interrupts and means for switching to the host system if the host system interrupt is present and means for continuing the interpretive execution mode if either the flag bit is set or there is no host I/O interrupt present.

It is an advantage of the present invention that host I/O interrupts can be handled by a low cost implementation without a guest system blocking a I/O interrupt for the host system. It is another advantage of the present invention that the system will be less likely to reassign a logical processor from a physical processor during spin locks.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
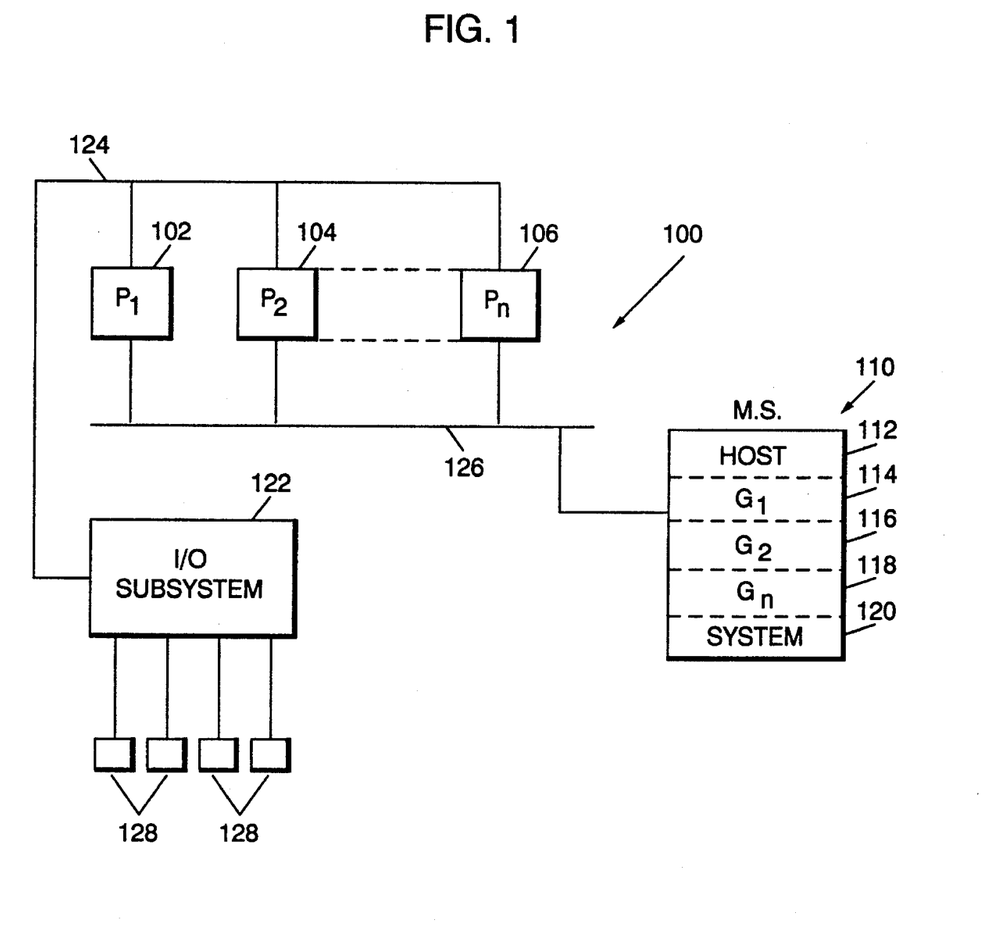
FIG. 1 is a block diagram of a multiprocessing information handling system embodying the present invention.

Referring now to FIG. 1, a multiprocessing information handling system embodying the present invention will be described.

System 100 includes a number of processors such as processor 102, 104, and 106. The processors are connected by memory system bus 126 to memory system 110 which includes partitioned storage areas 112 for host system and 114, 116 and 118 for guest systems G1, G2 . . . Gn, and 120 for system storage. Processors 102, 104 and 106 are also connected by a common I/O bus 124 to I/O subsystem 122 which controls a number of separate input/output devices 128 which may be communication devices, direct access storage devices, display systems or other I/O devices.

System 100 may be readily implemented by an IBM ES 9000 computer system with storage and peripherals operating under the VM/ESA operating system.

Figure 2:
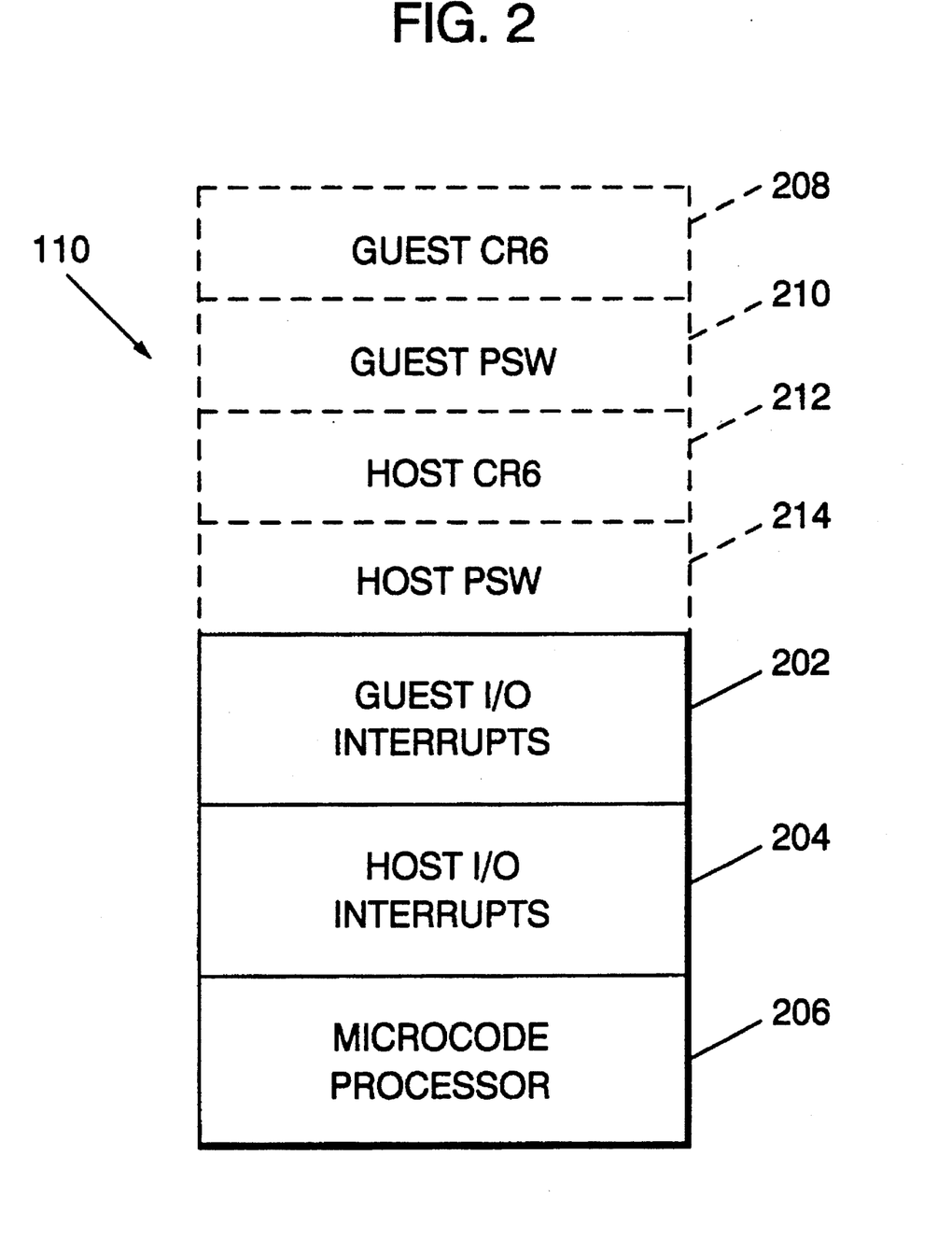
FIG. 2 is a block diagram of a portion of a memory system according to FIG. 1.

Referring now to FIG. 2, additional portions of memory system 110 will be described. Memory system 110 also includes a storage area 202 for storing guest system I/O interrupts, a storage area 204 for storing host system I/O interrupts, and a storage area 206 for storing processor microcode.

Figure 3:
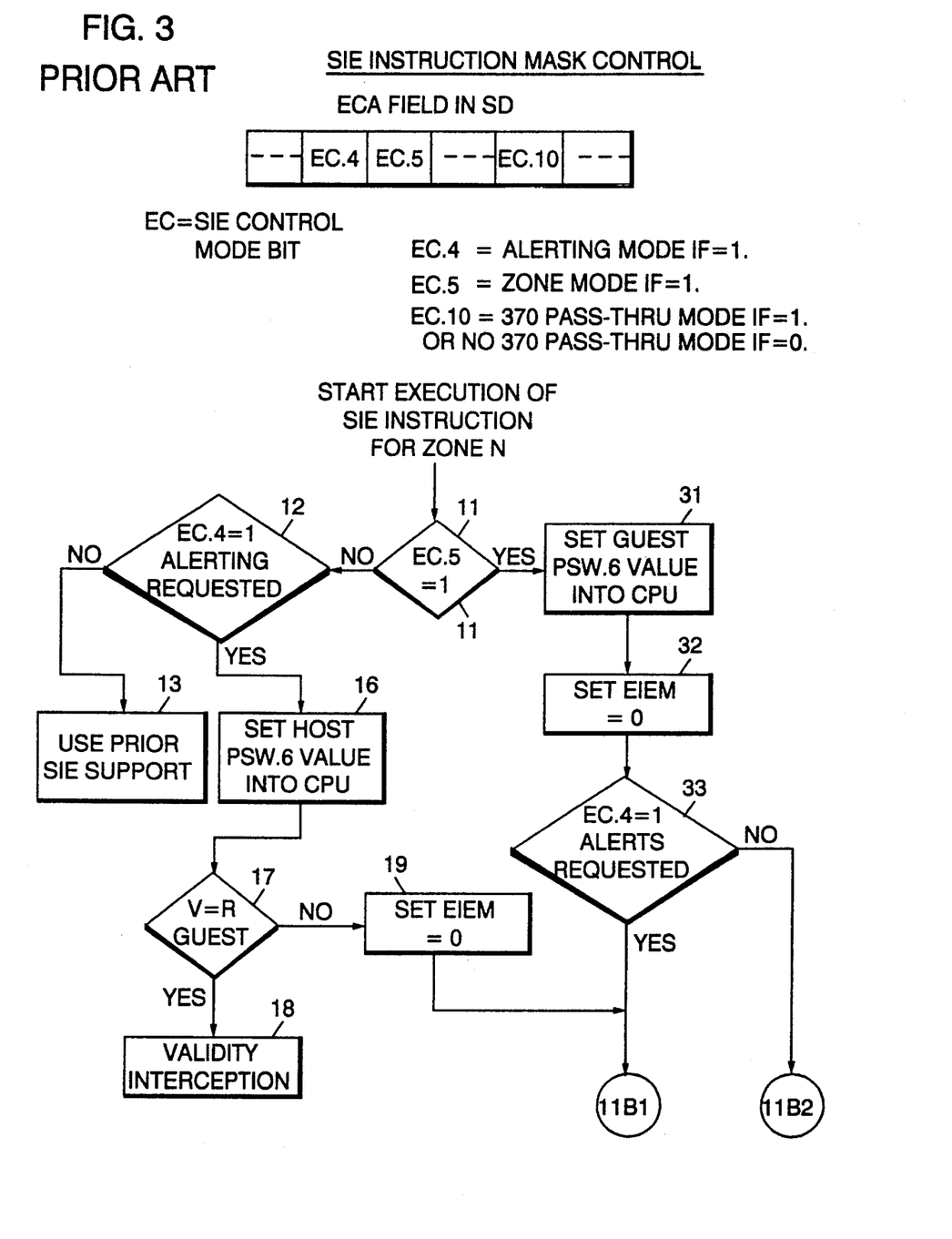
FIG. 3 is a flow chart of a prior art State Interpretive Execution Instruction Mask Control process.

Referring now to FIG. 3, a prior art system described in U.S. Pat. No. 4,843,541, incorporated by reference into the present application above, will be described.

The patent relates to method and apparatus for partitioning resources in a central electronics complex of a data processing system into a plurality of logical partitions. The partitioning system may be embodied in programming, microcode or by special hardware to enable highly efficient operation of a plurality of different programming systems in different zones of a system. The patent shows technique for assigning subsets of random access storage, central processor, channel and subchannel resources of a system to the different logical partitions in the system to enable a number of different preferred guests programming systems to run simultaneously in the different partitions. The different guest programming systems in the different partitions generally will be different operating systems such as VM (virtual storage) and MVS (multiple virtual storage).

More particularly, FIGS. 11A and 11B of the patent show the processor dispatch process for starting a preferred guest under the start interpretive execution (SIE) instruction. The operation of the system taught by the patent depends on an effective I/O interrupt enablement mask (EIEM), which is put into the processor hardware. The content of the EIEM directly controls the enablement of the I/O interrupt subclasses (ISCs) defined in the architecture. Indirectly, the EIEM content controls the guest interrupt enablement which is the focus of the present invention.

The enablement state of the processors program status word (PSW) bit 6 enables or disables the overall operation of the EIEM. The respective bit positions of the EIEM directly controls the selective enablement of the respective I/O subclass queues (represented by the ISCs in the I/O interrupt pending register (IPR) of the processor having this mask). Thus, this processor can then handle enabled pending I/O interruptions in enabled ISC only while the processor is also enabled by bit 6 in the current PSW for this processor.

The EIEM mask is generated for a preferred guest when the guest is dispatched on a processor in a system by issuance of the SIE instruction by the host program. The EIEM mask is then generated from a number of fields, including a field supplied by the host and from three fields obtained from the guest system's state descriptor (SD). The fields obtained from the guest SD are: an alerting zone mask (AZM), an active zone number (AZN), and a guest I/O interrupt enablement mask (GIEM). These guest fields are loaded into the local store of a processor while the guest is being dispatched on that processor.

The host field is obtained from processor control register 6 (CR6), which contains the host I/O interrupt enablement mask (HIEM).

The assigned zone number identifies the current guest to the processor on which an SD has been dispatched.

The host dispatching program will determine how it will respond to any alert signal and although the host response will generally be to dispatch the alerting guest on that processor, the host need not do so, but could take some other action.

The guest I/O interrupt enablement mask (GIEM) provides the ISC enablement control in the guest program. The HIEM provides the ISC enablement control in the host program.

The IEEM combines all of these masks for the current guest in any processor to control the processor operations of I/O interrupt handling by the current guests, and of alerting for other preferred guests that are currently enabled or being alerted.

FIG. 3 shows a sequence of control signals that control the manner in which the EIEM is being generated in either of two selected operating system modes.

The EIEM is used to control the processor operations of I/O interrupt handling and the alerting for another processor. These functions are determined independently for each guest while it is being SIE dispatched on any processor in the system. Hence, the EIEM is newly generated by the host process each time it dispatches a preferred guest on any processor in the system with an SIE instruction. The GIEM is held in a processor control register during operation of the respective preferred guest. When the processor operates in a first mode such as S/370 mode, register CR2 is used; in which case the GIEM may be referred to as the guest CR2 mask. When the processor operates in another mode such as 370 extended architecture or XA mode, control register CR6 is used; in which case the GIEM may be referred to as the guest CR6 mask.

Referring now more specifically to the process set forth in FIG. 3, the process begins with the start execution of an SIE instruction for a zone N. The alerting function may be used with the conventional V=V guest, which operates differently than a V=F guest.

If EC.5 is set to a 1 state, the "set guest PSW0.6 value into processor state" is entered.

I/O interruption handling and alert dispatching control is done independently for each processor in an MP system using the EIEM set into the processor for its current guest. It is done while the processor is running a zoned or V=V guest under the SIE instruction by using the following microcode sequence of operations in response to the broadcast of each I/O interruption signal (setting one or more IPR bits in each processor):

I. If the processor is enabled for interruption (i.e. guest PSW0.6 enabled), then save the current processor status, and determine the highest priority IPR.
  A. Determine if the I/O interruption is for the host, by testing if:
    1. EC.4 is on, and
    2. the AZM.0 bit is enabled, and
    3. The host CR6 mask bit N is enabled.
II. If the I/O interruption is not for the host, it is for a guest, and:
  A. Determine if the I/O interruption is for an alertable guest, by testing if:
    1. The I/O interrupt is for another guest N indicated by the subclass bit IPR.N being on, and
    2. The guest N has its alert bit AZM.N on.
      (a) If these alerting conditions exist, an alert intercept is given to the host, which may then dispatch the alerted guest on this processor.
  B. But if the I/O interruption is not for the host or an alertable guest, it must be for the guest dispatched on this processor. Test if interrupt is enabled by guest by:
    1. GIEM.(SCH.GISC)=1;
    2. SCH.P=1
      (a) If these conditions exist for the dispatched guest, its I/O interrupt is passed through to the guest to handle during the guest's dispatch on this processor.
  C. But if the I/O interruption is for the dispatched guest, but:
    1. The guest's I/O interrupt subclass bit in the effective CR6 mask is disabled while the guest PSW0.6 is enabled or SCH.P=0, then:
      (a) The host puts the guest's I/O interrupt on a guest software queue for the guest subclass indicated for this I/O interrupt, and
      (b) The host issues the guest's next sequential instruction to continue the guest's dispatch on this processor.
        (1) The guest will later handle the I/O interrupt when the guest's CR6 mask bit becomes enabled.
III. However, if the processor is disabled for interruption (i.e. guest PSW6 is disabled):
  A. This processor does not take any I/O interruption, which remains pending on its hardware interrupt queue unless accepted by another processor. I/O interruption handling and alert dispatching control is done independently for each processor in an MP system. It is done while the processor is running a zoned or V=V guest under the SIE instruction by using the following sequence of operations in response to any one or more Interrupt Pending Register (IPR) bits being found to be set on in the processor after it completes its execution of any instruction, which is signalled in its microcode with an "endop" micro-instruction.
    The IPR has a plurality of I/O interrupt subclass (ISC) bit positions which correspond to respective I/O interrupt queues in the system area of storage managed by the I/O processor (lOP) in a hardware manner. Any ISC bit position is set on whenever its corresponding queue has any I/O interrupt pending. The ISC bit position is automatically set on in he IPR of each processor in the MP by a broadcast of the ISC of each I/O interruption signal by the lOP to all processor in the MP. The ISC bit in the IPR remains set on until all I/O pending interrupts for that ISC are handled by any processor.
    Upon each endop microinstruction occurring at the completion of executing each instruction, each processor in the MP that is enabled for handling I/O interruptions looks at its IPR for any ISC in an on state. If any ISC is in an on state, the processor attempts to handle the pending interrupt. If any processor finds more than one ISC in an on state, it handles the ISC having the lowest bit position in the IPR, which is the ISC with the highest priority in the IPR.

The present invention as described herein is an improvement to the system and method described in U.S. Pat. No. 4,843,541 in that the system and method described in the referenced patent allows a guest system to effectively block host system I/O interrupts from being recognized and acted upon.

The present invention as described herein provides a mechanism to ensure that host system I/O interrupts are properly handled during the SIE polling interval.

At each Start Interpretive Execution (SIE) polling interval which may be 256 microseconds on previous generation machines and 128 microseconds on ES 9000 systems, the flag bit is tested and cleared.

If the flag bit has been set since the last polling period, a counter in one of Processors 102, 104, 106 for the number of disabled polling intervals is set to 0.

If the flag has not been set since the last polling interval, the counter for the number of disabled polling intervals is incremented.

If the counter for the number of disabled polling intervals reaches a predetermined number, such as 2, host system PSW bit 6 and bit 7 are then treated as being equal to their values at SIE entry, eliminating delay of extemal interruptions and I/O interruptions to the host beyond the specified number of polling intervals.

The guest system control register 6 contents are stored in area 208 of memory system 110. Guest system PSW is stored in are 210, host system control register 6 is stored in area 212 and host PSW is stored in area 214 of memory system 110.

Figure 4A:
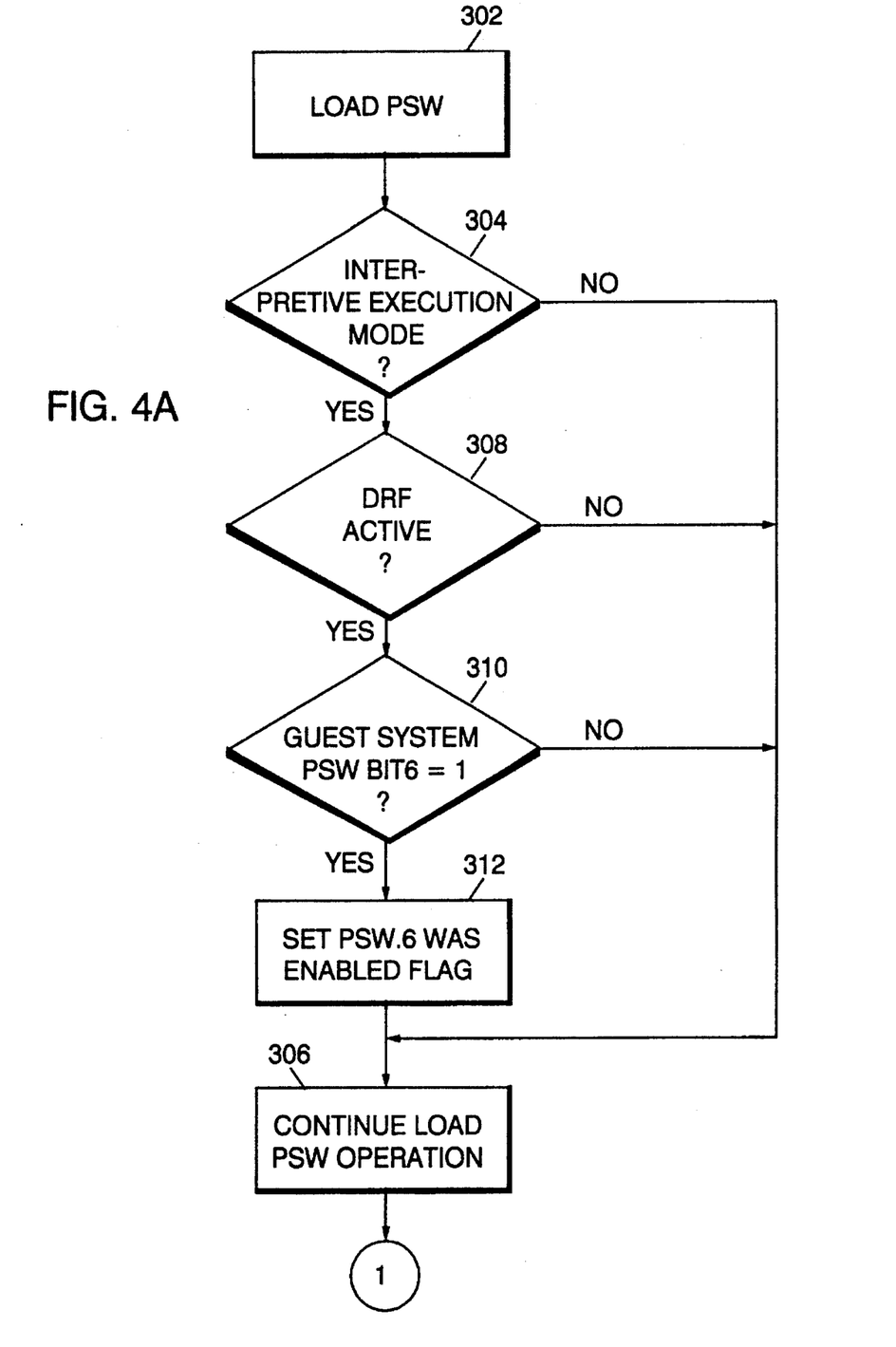
FIG. 4A, 4B, and 4C is a flow chart showing the operation of an apparatus and method according to the present invention in a first embodiment thereof.
Figure 4B:
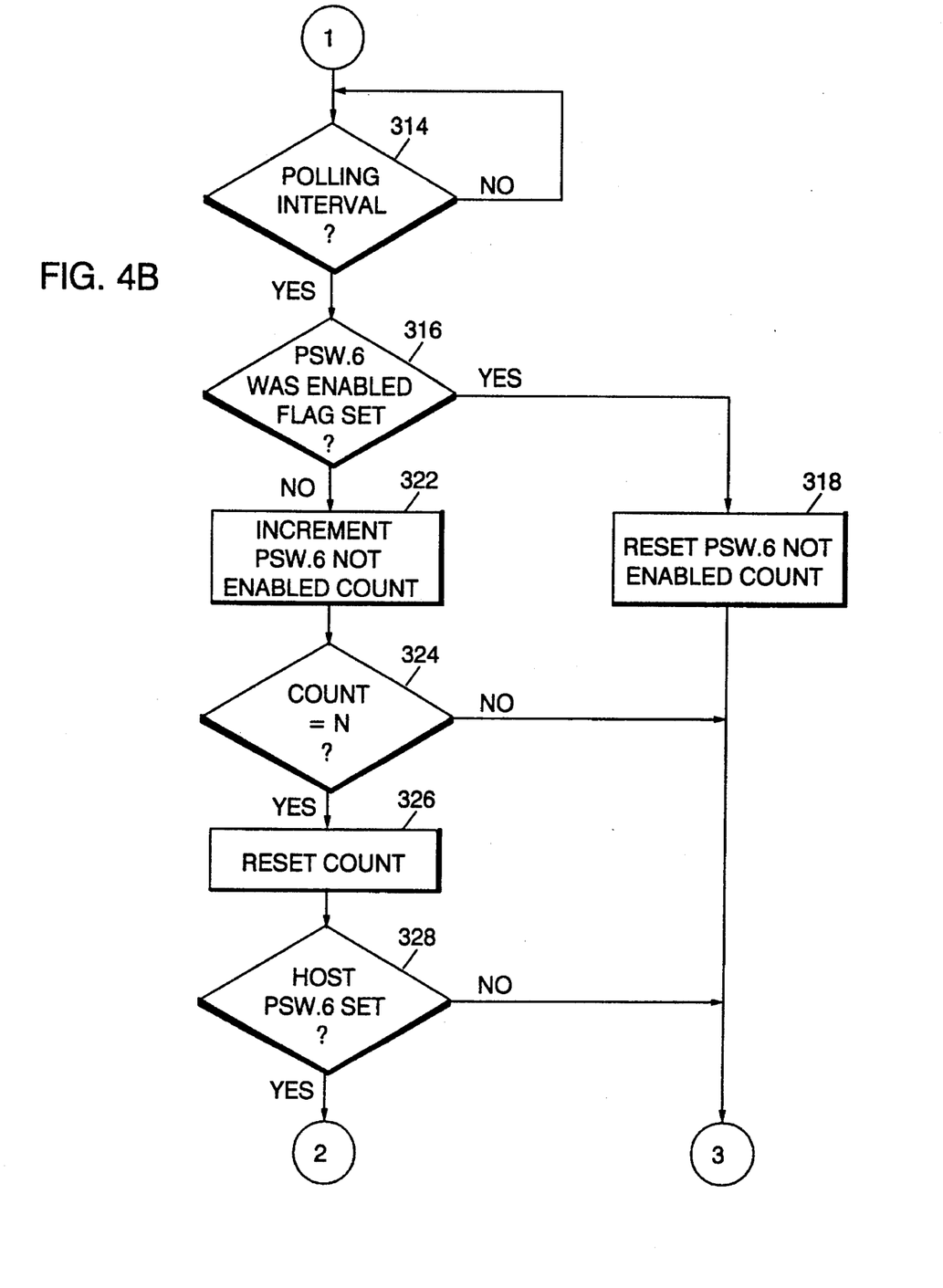
Figure 4C:
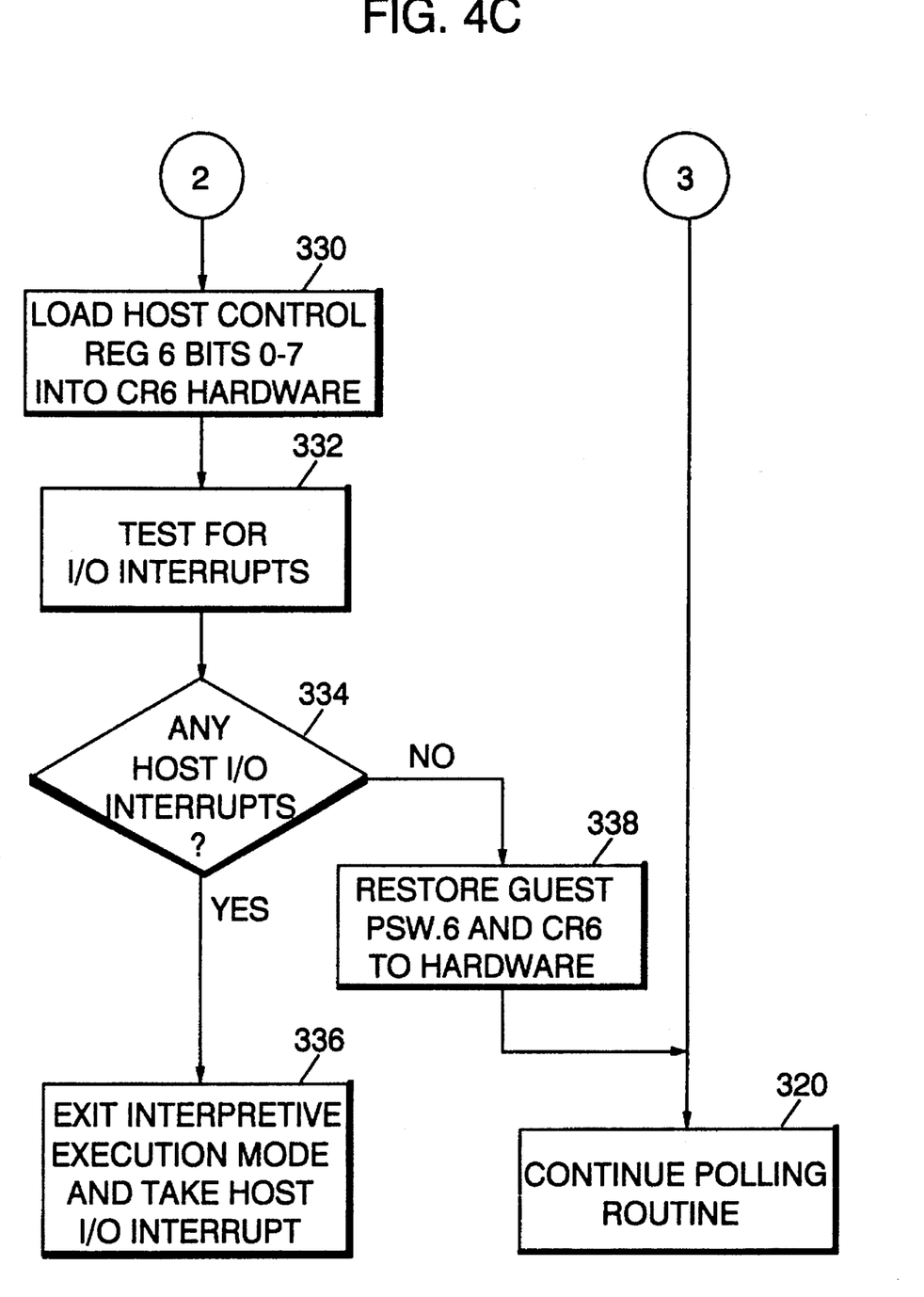

Referring now to FIGS. 4A, 4B, and 4C, the operation of the method and apparatus in accordance with the present invention to gate host enablement at polling intervals will be described.

Figure 5:
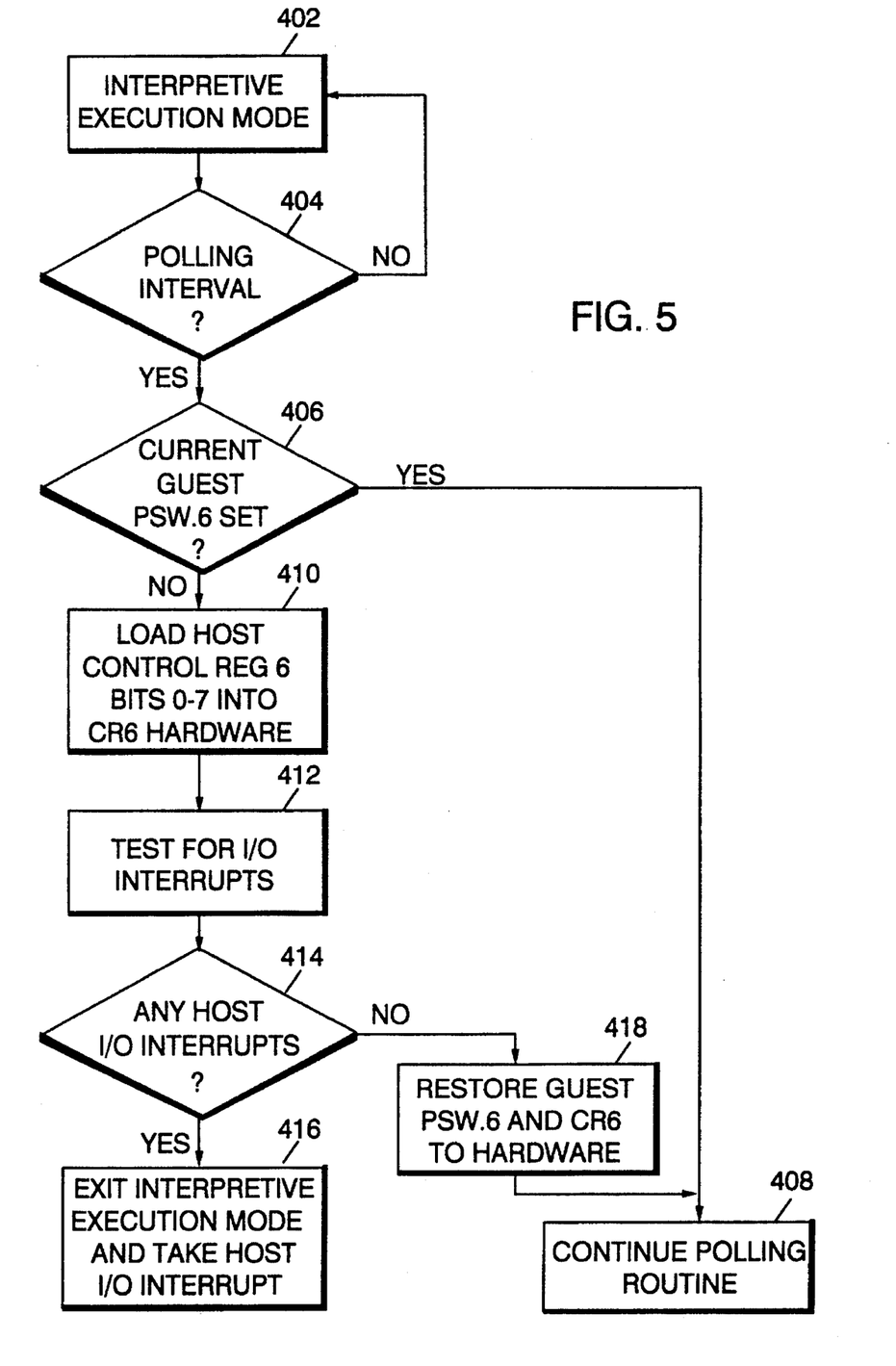
FIG. 5 is a flow chart showing the operation of the apparatus and method according to the present invention in a second embodiment thereof.

It should be noted that 4A, 4B, and 4C show a first embodiment which looks for host interrupts only if the guest PSW bit 6 I/O interrupt mask has not been enabled during the last n polling intervals and, FIG. 5 shows a second embodiment of the present invention which checks for host interrupts at every polling interval if the guest system PSW bit 6 is currently off.

Referring now more specifically to FIGS. 4A, 4B, and 4C, whenever any PSW, for example Load PSW instruction or Interrupt new PSW is loaded, the following process is executed.

When load PSW 302 is initiated, a test is made to determine if the hypervisor program is in interpretive execution mode 304. If not, the load PSW operation is continued at step 306. If interpretive execution mode is indicated, a test is made to determine if dedicated region facility (DRF) is active 308. If DRF is not active, the process proceeds to step 306 as above. If DRF is active, a next check is made to determine if the guest system PSW bit 6 equals 1 (step 310). If not, the operation proceeds to step 306 as above. If the guest system PSW bit 6 equals 1 at step 310, a flag is set at step 312 indicating that Guest PSW bit 6 was enabled. The process then continues to the end load PSW operation. Normal instruction processing continues. When the end of the IE polling interval is reached, step 314 is entered and a test is made to determine if PSW bit 6 "was enabled" flag has been set at step 316. If it has been determined that "PSW bit 6 was enabled flag" has been set, the "PSW bit 6 not enabled counter" is reset at step 318 and the polling routine continues at step 320 (see FIG. 4C).

Again referring to FIG. 4B, if the PSW bit 6 was enabled flag is not set, the not enabled count is incremented at step 322.

A predetermined threshold for "not enabled" count such as 2 is next tested against the value of "not enabled count" at step 324. If the threshold has not been reached, the count is incremented and the process proceeds to continue polling routine at step 320 as previously described. If the predetermined threshold count is detected in step 324, the count is reset in step 326 and a test is made to determine if the host system PSW bit 6 is set. If not, the process proceeds to continue the polling routine at step 320. If the host system PSW bit 6 is set, the host system control register 6 bits 0–7 are loaded into hardware control register 6 at step 330 (see FIG. 4C). Next, a test is made for I/O interrupts at step 332. If any host system I/O interrupts are detected at step 334, the interpretive execution mode is exited at step 336 and the host I/O interrupt is taken. If no host system I/O interrupts are found, the guest PSW bit 6 and guest control register 6 are restored to the hardware registers at step 338 and the polling routine continues at step 330 as previously described.

The above has described an embodiment of the present invention in which host I/O interrupts are only considered if a predetermined threshold for the not enabled count is achieved.

A second embodiment will now be described which does not consider history of the guest PSW bit 6 was enabled flag.

The second embodiment will be described with reference to FIG. 5. When the hypervisor program is in interpretive execution mode step 402, a test is made at step 404 to determine if the interpretive execution mode is in the polling interval. If not, the process loops until the polling interval is detected. Next, the current guest PSW bit 6 status is tested at step 406. If bit 6 is set, the polling routine is continued at step 408 similar to that described with the previous embodiment step 320. If the guest PSW bit 6 is not set, the host control register 6 bits 0–7 are loaded into the hardware control register 6 at step 410. Next, a test is made for I/O interrupts at step 412. If any host system I/O interrupts are detected at step 414, the interpretive execution mode is exited and the host system I/O interrupt is taken at step 416. If no host system I/O interrupt is detected, the guest program status word bit 6 and control register 6 are restored to the hardware registers in step 418 and the polling routine continues at step 408 as previously described.

Although the present invention and its advantages have been described in detail, it should be understood that various changes, substitutions and alterations can be made herein without departing from the spirit and scope of the invention as defined by the appended claims.

What is claimed is:

1. A method, for enabling a host system program, in a data processing system operating under a multiprocessing hypervisor program, comprising the steps of:

first, determining if a first predetermined bit indicates an interpretive execution mode for a guest system program;

second, determining if a second bit indicates an I/O pass-through state for the guest system program;

third, determining if a third bit, which is an I/O enablement mask, indicates an I/O enablement or disablement state for the guest system program;

polling at a predetermined time interval while the first bit indicates an interpretive execution mode;

testing for any host system I/O interrupt blocked by an I/O disablement state for the quest system program when the polling step indicates the end of a predetermined number of one or more time intervals;

exiting said interpretive execution mode, and the host system processing any host system I/O interrupt if any host system interrupt is found by the last testing step.

2. A method, for enabling a host system program, according to claim 1, wherein said step of testing for any host I/O interrupt further comprising the step of forcing a predetermined bit in a hardware program status word to a predetermined value.

3. A method, for enabling a host system program, according to claim 1, further comprising the step of continuing said polling if no interpretive execution mode, or if no host system I/O interrupt is present.

4. A method, for enabling a host system program, according to claim 1, further comprising the step of loading a first predetermined byte of data from a first control register into a current control register if said testing step indicates that said interpretive execution mode does not currently exist.

5. A method, for enabling a host system program, according to claim 1, further comprising the steps of:

setting a flag bit if the I/O disablement state exists; and testing said flag bit during said polling interval.

6. A method, for enabling a host system program, according to claim 1, further comprising the steps of:

counting the predetermined number of polling intervals during which said enablement mask is set to an I/O disabled state; and enabling said host to process any host I/O interrupt if said counting step reaches a predetermined value.

\* \* \* \* \*